United States Patent Office 2,867,519
Patented Jan. 6, 1959

2,867,519

HERBICIDAL GREASE COMPOSITION

Jeffrey H. Bartlett, Westfield, William H. Brugmann, Jr., Middlesex, and Arnold J. Morway, Clark, N. J., assignors to Esso Research and Engineering Company, a corporation of Delaware No Drawing. Application December 19, 1955
Serial No. 553,718

6 Claims. (Cl. 71—2.6)

This invention relates to grease compositions containing salts of halogenated aryloxyalkyl carboxylic acids, and to their use as brush killers and the like.

This application is a continuation-in-part of Serial No. 473,451, filed December 6, 1954.

The herbicidal and arboricidal activity of various phenoxy carboxylic acid esters such as the octyl ester of 2,4-dichloro- or 2,4,5-trichlorophenoxyacetic acid is well-known. Consequently, such agents have been heretofore incorporated in weed and brush killer formulations of the aqueous emulsion or oil spray type. On the other hand the use of salts of these chlorphenoxycarboxylic acids has not previously found much favor in floricidal spray or dusting formulations, despite the fact that intrinsically such salts are substantially more potent than the corresponding esters while at the same time being considerably cheaper than the latter. Of course, the main reason why the salts, as well as the acids themselves, have been found unsatisfactory has been their solubility in water which results in their being too readily leached from or washed off the original point of application by rain, irrigation, etc. Thus, when applied as a spray, they frequently cause only temporary top kill because their residual toxicity period is too short to permit translocation of the active agent into the plant roots. In addition, the dissolved salts may cause injury to valuable crops or plants onto which they may be carried in the rain water after being washed off the flora whose kill was desired.

Furthermore, even the formulations employing the essentially water insoluble esters have been subject to serious drawbacks. The foremost of these is their tendency, due to their considerable volatility, to "drift" or wander from the original point of application to contiguous areas where they may cause serious injury to sensitive crops such as cotton. The volatility of the esters also reduces the residual activity of the floricide and hence the intended weed control is not so long-lasting as desired. The previously known 2,4-D and 2,4,5-T type sprays or dusting formulas frequently have also caused injury to valuable plants by drifting or being accidentally blown to adjacent areas even in the course of the original spraying or dusting operation. Consequently, because of the difficulty of applying them with the desired degree of selectivity, and despite their excellent herbicidal potency toward poison oak, etc., the halogenated phenoxycarboxylic acid compounds have found relatively little use in horticulture.

These various drawbacks due to drift and lack of persistency have been substantially reduced by incorporating the commonly used herbicidal esters in viscous grease-like bases as proposed in aforesaid copending application Ser. No. 473,451. Such grease-like formulations not only reduce the volatility of the active esters but also permit brushing or daubing the floricidal (plant-killing) compound onto specific weeds, plants or trees. On the other hand, such ester containing grease-like formulations still are not only rather costly but also relatively non-permanent, due to the substantial volatility of the esters as well as the relative ease with which the floricide-containing oil base is leached out from such greases.

It is an object of the present invention to provide nonvolatile, long-persistent floricidal compositions by employing salts of halogenated aryloxyalkyl carboxylic acids. Another object is to provide grease-like compositions comprising a normally liquid hydrocarbon oil base and thickened to a grease-like consistency with the aid of a complex-like thickener containing a soap of a higher fatty acid in combination with a floricidal amount of a salt of a chlorinated phenoxycarboxylic acid. These and other objects, as well as the nature, operation and advantages of the invention will become more clearly apparent from the subsequent description.

It has now been discovered that highly effective floricidal compositions can be formulated from salts of halogenated aryloxyalkyl carboxylic acids by dispersing them with a conventional thickener in a normally liquid base such as a hydrocarbon oil or a synthetic ester base, thereby forming an adhesive grease wherein the floricidal agent is in an unusually permanent form. The salts of halogenated aryl-oxyalkyl carboxylic acids, being mild soaps as well as fioricides, themselves serve as a co-thickener as well as a floricidal compound. Thus, the conventional thickener requirement is substantially reduced by this cooperation of the herbicidal carboxylic acid salt.

The terms "floricidal" and "herbicidal" will be used interchangeably herein to denote the ability of a composition to kill or inhibit the growth of any undesirable plant, including trees, shrubs, herbs and similar weeds and the like.

Suitable as the floricidal salts in the practice of this invention are the various salts of halogenated aryloxyalkyl carboxylic acids. Among the metal salts those of mono and divalent metals such as sodium, potassium, lithium, calcium, and barium, deserve particular mention, though salts of aluminum, copper, lead, and the like can be used also. Furthermore, the present invention is especially noteworthy in that it permits the use of the relatively inexpensive water soluble salts such as those of sodium or potassium in floricides which have a high degree of persistency as well as excellent water resistance, due to the protective action of the other components present. Such greases are substantially water insoluble up to 150° F. On the basis of cost, the sodium salts are therefore especially advantageous, though the more water resistant lithium or calcium salts may be preferred where especially high resistance to rain water and the like is desired.

The acid portion of the floricidal soap is derived from a halogenated aryloxyalkyl carboxylic acid, among which 2,4-dichlorophenoxyacetic and 2,4,5-trichlorophenoxyacetic acid are particularly preferred. However, the corresponding brominated or iodinated derivatives, as well as generally halogenated phenoxy compounds having an aliphatic acid substituent of about 1 to 3 carbon atoms, e. g. a propionic acid radical or an ethyl sulfate radical, may be similarly useful. In other words, examples of suitable floricidal soaps include sodium 2,4-dichlorophenoxyacetate, lithium 2,4,5 - trichlorophenoxyacetate, calcium salt of 2,4-dichlorophenoxy-ethyl sulfate, etc.

The oil base useful herein may be a mineral oil ranging in viscosity between about 35 and 200 SSU (Saybolt seconds Universal)/210° F. or between about 50 and 2,000 SSU/100° F., "cold sett" type bases comprising rosin oil, synthetic polyester bases, etc. However, compositions comprising mineral oil are preferred.

The soaps or salts required herein may of course be preformed prior to being dispersed in the oil base or they may be formed in situ by reacting the free acid and a suitable basic compound after being dispersed in the oil, various such methods being well known in the grease making art. Furthermore, rather than forming a neutral soap, it is also possible to have an excess of up to about 2% of the free acid present, as long as enough soap or other thickening agent is dispersed in the oil base to give it the desired grease structure or consistency. Too much free acid tends to impair the solid grease structure. On the other hand, a moderate excess of free alkali is generally permissible, and frequently may be desirable, especially when pentachlorophenol, maleic hydrazide or other materials are added as synergists or for other purposes.

The amount of the floricidal haloacid salt may range from about 0.5 to 10%, based on the oil, depending on the desired degree of floricidal activity and grease consistency. Actually, since thickened grease compositions tend to adhere firmly at the point of original application, concentrations of about 0.5 to 2% of the floricidal chloroacid compound are frequently sufficient to achieve the desired floricidal effect, and it may therefore sometimes be economical to use only such small amounts of the floricide in the grease. However, these small amounts are generally insufficient to cooperate with the conventional thickener in developing the desired complex-like grease structure and consequently the preferred embodiments of this invention contain at least 1%, and preferably 2 to 8% of the floricidal salt, based on the oil, in order to achieve a high degree of permanence with a minimum amount of the conventional thickener.

In addition to the floricidal salt, the compositions of this invention contain a conventional grease thickener, preferably one with which the chloroacid salt can develop a complex-like structure. Suitable thickeners include the metal salts of the higher fatty acids or hydroxy-substituted fatty acids, especially those of about 12 to 20 carbon atoms, e. g. the alkali metal or alkaline earth metal salts of hydrogenated fish oil acids having a molecular weight and saturation substantially equivalent to stearic acid, sodium stearate, lithium hydroxystearate, potassium laurate, calcium palmitate, sodium oleate, the lithium salt of tall oil acid, and similar soaps well-known in the grease making art. Enough thickener is provided in the composition to produce the desired consistency, e. g. about 3 to 50% based on the oil, the amount depending upon the amount of floricidal chloroacid salt present to act as a co-thickener. However, in order to produce the optimum grease structure or complex, in accordance with this invention it is desirable to provide about 1 to 4 moles, preferably about 2 to 3 moles of the higher fatty acid soap per mole of the floricidal chloroacid salt present. Non-soap thickeners such as carbon black, finely divided silica, attapulgite, bentonite reacted with a quaternary ammonium base, etc., may be useful also.

Generally speaking the preferred compositions of this invention have the advantage that, due to the stable fibrous structure set up by the complex-like combination of floricidal salt and higher fatty acids soap, the floricidal agent will stay behind as a solid residue on the weed or brush stalks even if rain leaches out the oil or other liquid base. In contrast, in previously described herbicidal greases or pastes the herbicidal agent generally was dissolved in the base and therefore was washed away in it.

In general it is desirable to use the oil base and one or more thickening agents in such a combination as to produce a grease characterized by a penetration value of about 275 to 370 mm./10 unworked and a dropping point of at least 300° F., in order to assure a suitable degree of adhesiveness and guard against too easy melting in the sun.

In addition, of course, the compositions of this invention may contain other ingredients conventionally incorporated in grease, e. g. anti-oxidants such as phenyl-alpha-naphthylamine, structure modifiers, graphite, sulfurized fatty oils and other load-carrying agents, corrosion inhibitors, metal deactivators, etc. For instance, the addition of a small amount of a stringiness agent such as the various known olefinic polymers of 20,000 to 200,000 molecular weight, e. g. about 0.001% of 50,000 M. W. polybutene, may be desirable in giving greater adhesiveness and stickiness. Also, the addition of small amounts of corrosion inhibitors, e. g. sorbitan monooleate or oleic or other partial esters of pentaerythritol may be highly advantageous where the grease composition is dispensed from metal applicators or used to lubricate metal parts. Formulation of such a well-balanced grease may be especially advantageous for farm use since it will permit using the same material both as a floricide and as an effective grease for shop tools and other farm machinery, etc.

A specific example will now be given to illustrate the preparation and properties of a typical formulation embodying the teachings of this invention. All proportions are expressed throughout on a weight basis unless otherwise indicated.

*Example 1*

5 parts of 2,4-dichlorophenoxyacetic acid and 15 parts of essentially saturated hydrogenated fish oil acid of about 18 carbon atoms per molecule were mixed with 75.7 parts of a hydrofined coastal type petroleum distillate characterized by a viscosity of 55 SSU/210° F. and 500 SSU/100° F. The mixture was heated to 150° F. in a fire heated kettle. 38 parts of a 10% aqueous solution of lithium monohydrate was then added and the temperature raised to 400° F. with stirring, thereby neutralizing the free acids in the oil. Finally, 0.5 part of phenyl alpha naphthylamine was added to the hot mix and the molten mix was cooled by pouring into pans. The cold, solid, grease cake was then broken up and homogenized to yield a smooth, adhesive, uniform product having the following properties:

Appearance _____ Excellent smooth adhesive product.
Penetration at 77° F., mm.:
    Unworked _____ 23.4.
    Worked, 60 strokes _____ 27.5.
    Worked, 100,000 strokes ___ 28.0.
Water solubility (boiling water) _ Nil.
Dropping point, ° F. _____ 360.
Norma Hoffmann oxidation test,
  hours to 5 p. s. i. g. drop in
  oxygen pressure _____ 275.

The data indicate that the product, wherein a chlorinated aromatic acid forms part of a complex thickener, is suitable as a general purpose grease possessing a high degree of water insolubility.

The herbicidal effectiveness of this composition was tested by smearing a ½-inch band thereof around stalks of four broad leaf dock weed plants just above ground level. Within a few days the effectiveness of the herbicide became noticeable and in five weeks all four plants were dead, whereas all other vegetation in the area continued to thrive.

The grease of the invention is similarly effective for killing poison ivy, poison oak, as well as a weed, brush and tree killer generally.

Example 2

To further illustrate the utility of the invention, 75 parts of the grease of Example 1 were mixed with 25 parts of a motor oil blend composed of bright stock and high viscosity index phenol extracted distillate. The motor oil blend had a viscosity of 435 SSU/100° F. and a flash point of 450° F. Upon homogenizing the mixture, the following product was obtained:

| | |
|---|---|
| Appearance | Excellent smooth uniform adhesive product. |
| Penetration, 77° F., mm.: | |
|    Unworked | 29.5. |
|    Worked, 60 strokes | 31.0. |
|    Worked, 100,000 strokes | 33.0. |
| Dropping point, °F | 360. |

It is interesting to note that the dropping point of this grease is the same as in Example 1, despite the higher oil content of the former. This, of course, is indicative of the fact that the soap fibers or complexes which hold the oil are determinative of the dropping point of the grease system, independently of the amount of oil so held.

Example 2 also shows that greases compounded according to this invention can be easily diluted to any desired consistency, e. g. with regular crank case oil or even with drainings. This further increases the wide utility of the product on the farm or for other eventual users.

Having described the general nature, preparation, examples and advantages of the invention, its scope is particularly pointed out in the appended claims.

What is claimed is:

1. A herbicidal grease composition having an unworked penetration value of at least 27.5 mm. which comprises a mineral oil base normally having a viscosity of about 50 to 2000 SSU at 100° F., said oil base being thickened by a herbicidal thickener finely dispersed therein to form said grease composition, said thickener comprising the combination of 0.5 to 10 wt. percent, based on the oil base, of a herbicidal salt of a halogenated aryloxy compound having an aliphatic acid substituent of 1 to 3 carbon atoms and about 3 to 50 wt. percent, based on the oil, of a soap selected from the group consisting of alkali and alkaline earth metal soaps of $C_{12}$ to $C_{20}$ fatty acids.

2. A herbicidal grease composition having an unworked penetration value of at least 27.5 mm. which comprises a hydrocarbon oil base normally having a viscosity of 50 to 2000 SSU at 100° F., said oil base being thickened by a herbicidal thickener finely dispersed therein to form said grease composition, said thickener comprising the combination of 2 to 8 wt. percent, based on the oil base, of a herbicidal metal salt of a chlorocompound of the class consisting of 2,4-dichlorophenoxyacetic acid, 2,4-dichlorophenoxypropionic acid, 2,4,5-trichlorophenoxy acetic acid, and 2,4-dichlorophenoxy ethyl sulfate, and 1 to 4 moles per mole of said herbicidal metal salt of a metal salt of a fatty acid having 12 to 20 carbon atoms per molecule, wherein said metals are selected from the class consisting of alkali and alkaline earth metals.

3. A herbicidal composition according to claim 2 wherein the fatty acid salt is an alkali metal salt of hydroxy-stearic acid.

4. A herbicidal composition according to claim 2 wherein the chlorocompound salt is the lithium salt of 2,4-dichlorophenoxy acetic acid.

5. A herbicidal composition according to claim 4 wherein the fatty acid salt is a lithium soap of a hydrogenated fish oil acid of about 18 carbon atoms per molecule.

6. A grease composition which comprises 100 parts of a mineral oil base normally having a viscosity of about 500 SSU at 100° F., said oil base being thickened to a grease consistency corresponding to an unworked penetration value of at least 27.5 mm. by having dispersed therein a herbicidal thickener comprising the combination of about 2 to 8 parts of lithium, 2,4-dichlorophenoxyacetate and about 2 to 3 moles per mole acetate of the lithium soap of hydrogenated fish oil acids.

References Cited in the file of this patent

UNITED STATES PATENTS

| | | |
|---|---|---|
| 1,999,524 | Molin | Apr. 30, 1935 |
| 2,326,471 | Lontz | Aug. 10, 1943 |
| 2,417,264 | Morway et al. | Mar. 11, 1947 |
| 2,580,653 | Bridgeman | Jan. 1, 1952 |